United States Patent [19]
Cooper

[11] 3,877,319
[45] Apr. 15, 1975

[54] STEERING COLUMN ASSEMBLY
[75] Inventor: Duane D. Cooper, Midland, Mich.
[73] Assignee: General Motors Corporation, Detroit, Mich.
[22] Filed: Nov. 19, 1973
[21] Appl. No.: 416,831

[52] U.S. Cl. .............. 74/492; 188/1 C; F16d/63/00
[51] Int. Cl. .............................................. B62d 1/16
[58] Field of Search ................ 74/492, 493; 188/1 C

[56] References Cited
UNITED STATES PATENTS

| | | | |
|---|---|---|---|
| 3,412,628 | 11/1968 | DeGain | 74/492 |
| 3,600,970 | 8/1971 | Loofbourrow | 74/492 |
| 3,665,778 | 5/1972 | Bohan et al. | 74/492 |
| 3,788,148 | 1/1974 | Connell et al. | 74/492 |
| 3,815,438 | 6/1974 | Johnson | 74/492 |

Primary Examiner—Samuel Scott
Assistant Examiner—Lance W. Chandler
Attorney, Agent, or Firm—Saul Schwartz

[57] ABSTRACT

A vehicle steering column assembly of the collapsible, energy absorbing type incorporating an improved shift tube construction, the initial collapse load of which is closely controllable, the shift tube including a pair of telescopically related and radially spaced tube members, a plurality of radially projecting lanced keys on one of the tube members, a corresponding plurality of open-ended slots on the other tube member receiving respective ones of the keys for coupling the tube members for unitary rotation, and a cylindrical sleeve bearing between the tube members for facilitating relative axial collapse therebetween. The closed end of each slot engages the corresponding one of the lanced keys to normally prevent relative collapse between the tube members but is operative under predetermined axial loading on the shift tube to radially deform the corresponding key out of the slot to permit relative axial collapse.

3 Claims, 5 Drawing Figures

PATENTED APR 1 5 1975  3,877,319

STEERING COLUMN ASSEMBLY

This invention relates generally to vehicle steering column assemblies of the type adapted for collapse in an energy absorbing mode and more particularly to an improved construction for a collapsible tube portion of the column assembly.

A typical energy absorbing, collapsible steering column assembly for a modern automobile includes a steering shaft for transferring steering torque between a steering hand wheel and a steering gear and an outer support tube or mast jack constructed to longitudinally or telescopically collapse in an energy absorbing mode under axial loading. Additionally, if the vehicle is of the type having a transmission range selector lever on the steering column, the column assembly would further include a shift tube rotatably disposed inside the mast jacket around the steering shaft. During collapse of the mast jacket, of course, both the steering shaft and the shift tube must also collapse and each is, therefore, constructed to undergo axial collapse after a predetermined minimum axially directed load is experienced. Further, since the collapse load for each component of the steering column assembly has an effect on the total load necessary to initiate axial collapse of the entire column assembly, it is necessary that the collapse load of each component be held within close tolerance limits. A steering column assembly according to this invention incorporates an improved shift tube construction especially effective in maintaining the magnitude of force necessary to initiate collapse of the shift tube within relatively close tolerance limits.

The primary feature, then, of this invention is that it provides an improved vehicle steering column assembly of the collapsible, energy absorbing type. Another feature of this invention resides in the provision in the steering column assembly of an improved shift tube construction which renders the shift tube rigid for normal operation but which permits axial collapse of the shift tube when an axial load thereon achieves a magnitude falling within a predetermined, relatively narrow tolerance range. Yet another feature of this invention resides in the provision in the improved shift tube construction of a pair of axially aligned tube members disposed in telescopic and radially spaced relationship, the radial spacing insuring that any deviations in tube dimensions, as might result from manufacturing variations, have no effect on the magnitude of the axial load necessary to initiate collapse. Still another feature of this invention resides in the provision in the improved shift tube construction of a plurality of radially deformable keys on one tube member engaging slots in the other tube member for coupling the tube members together for unitary rotation and in the provision of a bearing sleeve between the tube members which maintains the tube members in radially spaced relationship while facilitating smooth axial collapse after the keys are deformed radially out of the slots. These and other features of this invention will be readily apparent from the following specification and from the drawings wherein:

Figure 1:
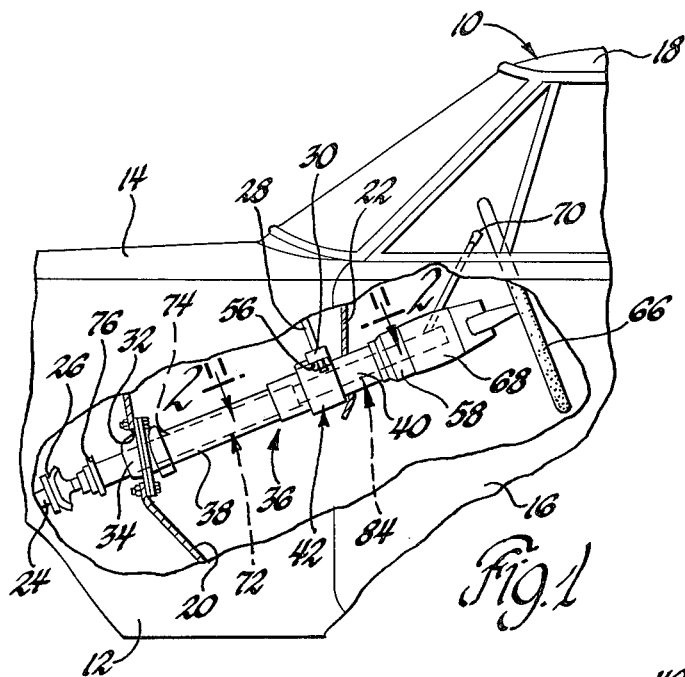
FIG. 1 is a fragmentary partially broken away side elevational view of an automobile type vehicle incorporating a steering column assembly according to this invention.

Referring now to the drawings, FIG. 1 depicts in fragmentary side elevation an automobile type vehicle body designated generally 10 including a fender assembly 12, a hood 14, a door 16 swingably supported on the body and a roof structure 18. The body interior, or passenger compartment, is bounded at the forward end by a fire wall 20 and an instrument panel structure extends transversely across the forward portion of the body interior, only a vertical wall portion of the instrument panel structure being indicated at 22. A conventional steering gear, not shown, is supported on the body forwardly of the fire wall and includes input shaft 24 which terminates at a flexible coupling 26. Within the body interior and forwardly of the vertical panel 22, a pair of laterally spaced struts 28, FIGS. 1 and 2, project generally vertically downward and rigidly support a collar 30. The fire wall 20 includes an aperture 32 around which is disposed a support member 34 rigidly attached to the fire wall. The struts 28, the collar 30 and the support member 34 cooperate in supporting on the vehicle body an energy absorbing, collapsible steering column assembly constructed according to this invention and designated generally 36.

Figure 2:
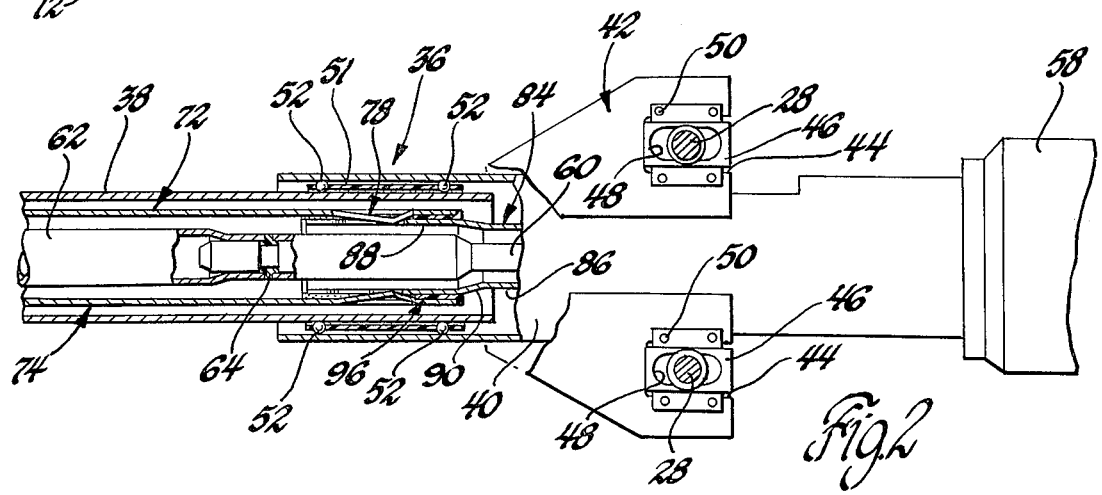
FIG. 2 is an enlarged partially broken away sectional view taken generally along the plane indicated by Lines 2—2 in FIG. 1.

Referring now to FIGS. 1 and 2, the column assembly 36 includes a cylindrical lower mast jacket section 38, the lower extremity of the mast jacket section 38 being connected to the support member 34 and thereby supported on the body 10. The column assembly further includes a cylindrical upper mast jacket section 40 to which is rigidly attached an instrument panel bracket 42. The instrument panel bracket includes a pair of rearwardly opening slots 44 in which are slidably disposed respective ones of a pair of pads 46. Each pad includes a slot 48 and is releasably maintained in the corresponding slot 44 by a plurality of injection molded plastic pins 50.

The upper mast jacket section 40 is disposed in axial alignment with the lower mast jacket section 38, the lower extremity of the upper mast jacket section telescopically overlapping the upper extremity of the lower mast jacket section. Disposed in the annular space between overlapping portions of the upper and lower mast jacket sections and aligned by a spacer sleeve 51 are a plurality of rolling elements 52 which function as described hereafter to effect energy absorption during collapse of the column assembly. The upper mast jacket section overlaps the lower mast jacket section by an amount sufficient to align the slots 48 in the pads 46 with corresponding ones of the struts 28 which, in the installed position of the steering column assembly, FIGS. 1 and 2, project through the slots. A nut-type fastener 56 disposed on a threaded end of each strut 28 clamps the instrument panel bracket to the collar 30 thereby to support the steering column assembly on the vehicle body for normal operation.

The upper or inboard end of the upper mast jacket section 40 rigidly supports a hub 58 which provides a housing for a bearing, not shown, the bearing rotatably supporting a steering shaft upper section 60. The steering shaft upper section is aligned generally on the longitudinal axis of the steering column assembly and is received within the upper end of a steering shaft lower section 62, the latter being similarly aligned on the longitudinal axis of the steering column assembly and projecting beyond the fire wall 20. The two steering shaft sections are coupled by conventional means, not shown, for unitary rotation and are maintained in rigid axial relationship by an injection molded plastic ring 64. A steering hand wheel 66 is rigidly attached to the outboard end of the steering shaft upper section 60 while the distal end of the steering shaft lower section 62 is attached to the flexible coupling 26 so that steering torque applied at the hand wheel is transferred to the input shaft 24 through the composite steering shaft defined by the two sections 60 and 62.

As seen best in FIGS. 1 and 2, the steering column assembly 36 further includes a shift bowl 68 rotatably supported on the upper mast jacket section 40 between the hub 58 and the steering hand wheel 66, the shift bowl having supported thereon a conventional shift lever 70. The shift lever provides a convenient handle for manual rotation of the shift bowl 68 which is connected to a shift tube 72 constructed in accordance with this invention and disposed concentrically around the steering shaft between the latter and the upper and lower mast jacket sections.

The shift tube 72 includes a first or lower cylindrical tube member 74 of substantially constant diameter. Tube member 74 is rotatably supported within the lower mast jacket section 38 and projects beyond the fire wall 20, a bracket 76 being attached to the tube member forward of the fire wall. The first tube member includes a plurality of integral lanced keys 78 which project radially inward. Each key includes a primary ramp surface 80 and a secondary ramp surface 82 disposed at an angle relative to the primary ramp surface.

Figure 3:
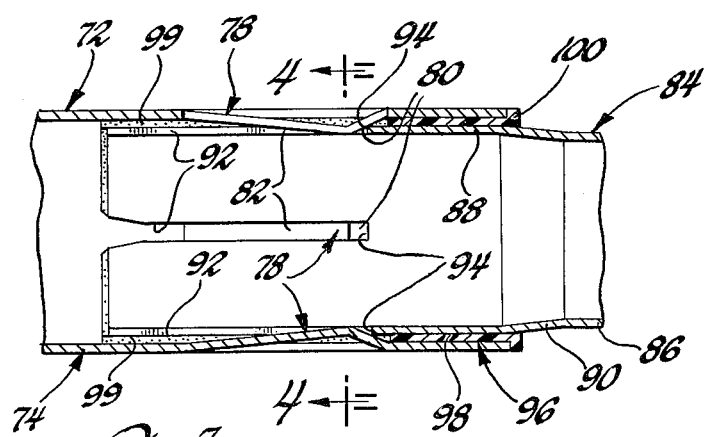
FIG. 3 is an enlarged view of a portion of FIG. 2 showing only the connection between a pair of tube members of a shift tube constructed according to this invention.

As seen best in FIGS. 2 and 3, the shift tube 72 further includes an upper or second cylindrical tube member 84 rotatably supported within the upper mast jacket section 40. The second tube member surrounds the steering shaft upper section 60 and includes a small diameter portion 86 and a large diameter portion 88 interconnected by a shoulder 90. A plurality of axially extending slots 92 are formed in the large diameter portion 88 of the first tube member, each slot including an open end and a closed end 94, FIG. 3. The large diameter portion 88 is predeterminedly smaller than the first tube member 74 and projects telescopically into the latter in radially spaced relationship. Each of the keys 78 is received in a corresponding one of the slots 92 with the closed end 94 of the slot engaging in primary ramp surface 80 of the corresponding key. Accordingly, the keys and the slots cooperate in coupling together the first and second tube members for unitary rotation while normally preventing relative axial telescopic collapse therebetween.

Figure 4:
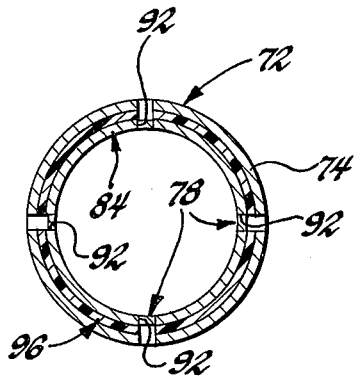
FIG. 4 is a sectional view taken generally along the plane indicated by Lines 4—4 in FIG. 3.
Figure 5:
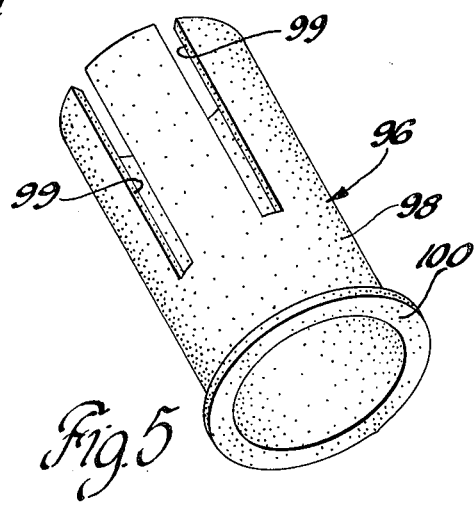
FIG. 5 is a perspective view of a bearing sleeve incorporated in a shift tube constructed according to this invention.

As seen best in FIGS. 3, 4 and 5, the shift tube 72 further includes a cylindrical plastic sleeve bearing 96, the bearing including a cylindrical wall portion 98 having a plurality of slots 99 therein and an integral annular flange 100. The sleeve bearing 96 is relatively lightly press-fitted into the upper or outboard end of the first tube member 72 with each slot 99 receiving a corresponding one of the keys 78 and with the annular flange 100 engaging the end surface of the tube member. The sleeve bearing is preferably fabricated from a plastic material, teflon for example, which is effective to accommodate dimensional variations between the first and second tube members without significantly impeding relative axial movement therebetween. Additionally, the sleeve bearing positively maintains the tube members in axial alignment.

Referring now to FIGS. 1, 2 and 3 and describing the operation of the steering column assembly, the rolling elements 52 are in interference engagement between the upper and lower mast jacket sections 40 and 38 and normally maintain the latter in fixed axial relationship. Similarly, the plastic ring 64 maintains the upper and lower steering shaft sections 60 and 62 in fixed axial relationship and the keys 78 and slot ends 94 maintain the first and second tube members 74 and 84 in fixed axial relationship. Steering torque applied at the hand wheel 66 is transferred to the input shaft 24 through the upper and lower steering shaft sections for controlling the direction of the vehicle. Manual torque applied at the shift lever 70 is transferred through the shift bowl to the shift tube 72 and to control linkage, not shown, attached to the bracket 76 forward of the fire wall.

The steering column assembly 36 is, of course, intended to axially collapse under predetermined axial loading. During such collapse the upper and lower mast jacket sections, the steering shaft sections, and the first and second tube members of the shift tube experience simultaneous relative telescopic collapse. With respect to the upper and lower mast jacket sections, relative collapse therebetween begins when the applied force level is sufficient to effect rolling of the elements 52 into the adjacent surfaces of the mast jacket sections, this occurring at a predetermined force magnitude. Such rolling is, of course, accompanied by localized plastic deformation of each mast jacket section which deformation effects energy absorption. For a full and complete description of the interaction between the mast jacket sections 38 and 40 and the rolling elements 52, reference may be made to U.S. Pat. No. 3,392,599, issued to R. L. White and assigned to the assignee of this invention.

With respect to the upper and lower steering shaft sections 60 and 62, relative telescopic collapse is initiated when the axial load experienced thereby is sufficient to effect fracture of the plastic ring 64. After the ring 64 is fractured, of course, there is substantially no further resistance to collapse of the composite steering shaft.

With respect to the first and second tube members 74 and 84 of the shift tube 72, relative collapse therebetween is initiated when the axial load achieves a magnitude sufficient to effect permanent deformation of the keys 78. More particularly, the closed ends 94 of the slots 92 function as abutments which apply force on the corresponding primary ramp surfaces 80 of the keys, the forces functioning to deform the keys out of the corresponding slots 92. With the keys 78 out of the corresponding slots the connection between the first and second tube members is terminated. After the connection is terminated, the bearing 96 provides a smooth surface for relative sliding movement between the first and second tube members. Because of the flange 100, the bearing remains in fixed position relative to the first tube member 74 so that once the shoulder 90 passes the inboard end of the bearing sleeve there is virtually no resistance to complete axial collapse of the shift tube. Those skilled in the art will, of course, appreciate that the axial load necessary to initiate relative collapse between the tube members 74 and 84 can be tailored to different application by adjusting the various dimensions of the keys 78.

Having thus described the invention, what is claimed is:

1. In a steering column assembly adapted for axial collapse in an energy absorbing mode in response to an axially directed force input exceeding a predetermined minimum magnitude, the combination comprising, a first tube member rotatably disposed on said steering column assembly, a second tube member rotatably disposed on said steering column assembly in axial alignment with said first tube member and including an end portion disposed in radially spaced telescopic relationship with respect to a corresponding end portion on said first tube member, bearing means disposed in the space between said telescopically related end portions for facilitating relative axial collapse therebetween, means on one of said first and said second tube member end portions defining a plurality of receptacles, means in the other of said first and said second tube member end portions defining a corresponding plurality of radially deformable keys projecting into respective ones of said receptacles for coupling said first and said second tube members for unitary rotation, and means on said one of said first and said second tube member end portions defining a plurality of abutments engaging corresponding ones of said keys for preventing relative axial collapse between said first and said second tube members, each of said abutments being operative to effect radial deformation of the corresponding one of said keys out of said receptacles for permitting relative axial collapse between said first and said second tube members when said axially directed force input achieves said predetermined minimum magnitude.

2. In a steering column assembly adapted for axial collapse in an energy absorbing mode in response to an axially directed force input exceeding a predetermined minimum magnitude, the combination comprising, a first cylindrical tube member rotatably disposed on said steering column assembly, a second tube member rotatably disposed on said steering column assembly in axial alignment with said first tube member and including a cylindrical end portion disposed in radially spaced telescopic relationship with respect to a corresponding cylindrical end portion on said first tube member, a cylindrical bearing having an annular flange at one end, said bearing being disposed between said cylindrical end portions with said annular flange abutting and end surface of one of said first and said second tube members thereby to prevent relative axial movement between said bearing and said one tube member while facilitating relative axial collapse between said first and said second tube members, means on one of said first and said second tube member end portions defining a plurality of axially extending slots each having one open end and one closed end, and means on the other of said first and said second tube member end portions defining a corresponding plurality of radially deformable keys projecting into respective ones of said slots for coupling said first and said second tube members for unitary rotation, each of said slot-closed ends engaging a corresponding one of said keys for preventing relative axial collapse between said first and said second tube members and being operative to effect radial deformation of said corresponding key out of said slot for permitting relative axial collapse between said first and said second tube members when said axially directed force input achieves said predetermined minimum magnitude.

3. In a steering column assembly including an upper mast jacket section, a lower mast jacket section, and means interconnecting said first and said second mast jacket sections operative to normally maintain said first and said second mast jacket sections in fixed axial relationship and to permit relative axial telescopic collapse in an energy abosrbing mode in response to an axially directed force input exceeding a predetermined minimum magnitude, the combination comprising, a first cylindrical tube member having a substantially constant diameter rotatably disposed on said steering column assembly and adapted for bodily movement as a unit with said lower mast jacket section, a second cylindrical tube member having a diameter substantially less than said constant diameter rotatably disposed on said steering column assembly and in axial alignment with said first tube member adapted for bodily movement as a unit with said upper mast jacket section, means on said second tube member defining a cylindrical end portion having a diameter intermediate the diameters of said first and said second tube members, said end portion being telescopically disposed within said lower mast jacket section and spaced radially therefrom, a cylindrical bearing having an annular flange at one end, said bearing being disposed between said end portion and said first tube member with said annular flange engaging an end surface of said first tube member thereby to prevent relative axial movement between said bearing and said first tube member while facilitating relative axial collapse between said first and said second tube members, means on said end section defining a plurality of angularly spaced and axially extending slots each having one open end and one closed end, and means on said first tube member defining a corresponding plurality of integral radially deformable keys each projecting radially inwardly into a respective one of said slots for coupling said first and said second tube members for unitary rotation, each of said slot-closed ends engaging a corresponding one of said keys for preventing relative axial collapse between said first and said second tube members and being operative to effect radial deformation of said corresponding key out of said slot for permitting relative axial collapse between said first and said second tube members when said axially directed force input achieves said predetermined minimum magnitude.

* * * * *